United States Patent
Feng et al.

(10) Patent No.: US 9,592,442 B2
(45) Date of Patent: Mar. 14, 2017

(54) COMMUNICATION METHOD, SYSTEM, SERVER AND CLIENT DEVICE FOR USER-INTERACTIVE SYSTEM

(71) Applicant: TENCENT TECHNOLOGY (SHENZHEN) COMPANY LIMITED, Shenzhen (CN)

(72) Inventors: Feng Feng, Shenzhen (CN); Yuxun Zhou, Shenzhen (CN); Jinglin Ma, Shenzhen (CN); Chen Wang, Shenzhen (CN); Zhidan Ma, Shenzhen (CN); Yuanxue Zhao, Shenzhen (CN); Lanqi Song, Shenzhen (CN); Ansong Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 347 days.

(21) Appl. No.: 14/279,646

(22) Filed: May 16, 2014

(65) Prior Publication Data

US 2014/0309030 A1    Oct. 16, 2014

Related U.S. Application Data

(63) Continuation of application No. PCT/CN2013/087817, filed on Nov. 26, 2013.

(30) Foreign Application Priority Data

Apr. 11, 2013 (CN) .......................... 2013 1 0124553

(51) Int. Cl.
*G06F 15/16* (2006.01)
*A63F 13/30* (2014.01)
(Continued)

(52) U.S. Cl.
CPC ............ *A63F 13/12* (2013.01); *G06Q 10/107* (2013.01); *G06Q 50/01* (2013.01); *H04L 51/32* (2013.01);
(Continued)

(58) Field of Classification Search
CPC . H04L 12/1813–12/1827; H04L 51/28–51/36; H04L 61/15–61/1529; H04L 61/1547–61/1564; A63F 2300/572
See application file for complete search history.

(56) References Cited

U.S. PATENT DOCUMENTS

| 8,990,340 B1* | 3/2015 | Polis ....................... H04L 67/00 709/206 |
| 2002/0023132 A1* | 2/2002 | Tornabene ............. G06Q 10/10 709/205 |

(Continued)

FOREIGN PATENT DOCUMENTS

| CN | 101860494 A | 10/2010 |
| CN | 102377683 A | 3/2012 |
| CN | 103179026 A | 6/2013 |

OTHER PUBLICATIONS

The World Intellectual Property Organization (WIPO) International Search Report for PCT/CN2013/087817 Mar. 6, 2014.
(Continued)

*Primary Examiner* — Brendan Higa
(74) *Attorney, Agent, or Firm* — Anova Law Group, PLLC

(57) ABSTRACT

Communication methods, systems, servers, and client devices in a user-interactive system are provided herein. In an exemplary method, a communication interface can be started via a first user-interactive client by a first user to communicate with one or more communication tools via a communication backend server. The first user-interactive client can obtain and display a plurality of second user IDs
(Continued)

of second users. The first user-interactive client can receive one or more second user IDs selected by the first user to add to a communication group. The first user-interactive client can send to the communication backend server a message for joining the communication group containing the one or more second user IDs. After receiving an accepting message from the communication backend server, during a user-interactive operation, the first user-interactive client can communicate with a second client corresponding to a user ID contained in the accepting message.

20 Claims, 8 Drawing Sheets

(51) Int. Cl.
  *H04L 12/58* (2006.01)
  *H04L 29/12* (2006.01)
  *G06Q 10/10* (2012.01)
  *G06Q 50/00* (2012.01)

(52) U.S. Cl.
  CPC .... *H04L 61/1564* (2013.01); *A63F 2300/572* (2013.01)

(56) References Cited

U.S. PATENT DOCUMENTS

| | | | |
|---|---|---|---|
| 2006/0085483 A1* | 4/2006 | Mooney | G06F 17/30578 |
| 2007/0255785 A1* | 11/2007 | Hayashi | G06F 17/30017 709/204 |
| 2008/0261569 A1* | 10/2008 | Britt | G06Q 10/107 455/414.1 |
| 2009/0019367 A1* | 1/2009 | Cavagnari | G06F 21/62 715/716 |
| 2009/0147771 A1* | 6/2009 | Seal | H04M 1/2535 370/352 |
| 2009/0181767 A1* | 7/2009 | Feng | A63F 13/12 463/29 |
| 2011/0055234 A1* | 3/2011 | Miettinen | G06F 17/30985 707/755 |
| 2011/0106662 A1* | 5/2011 | Stinchcomb | G06Q 30/06 705/26.43 |
| 2011/0131663 A1* | 6/2011 | Kaikuranta | G06F 3/0486 726/28 |
| 2012/0173526 A1 | 7/2012 | Abrams et al. | |
| 2012/0209998 A1* | 8/2012 | Svarfvar | G06Q 30/02 709/225 |
| 2013/0318085 A1* | 11/2013 | Pepper | G06Q 10/10 707/737 |

OTHER PUBLICATIONS

The State Intellectual Property Office of the People's Republic of China (SIPO) Office Action 1 for 201310124553.3 Jun. 3, 2015.
The State Intellectual Property Office of the People's Republic of China (SIPO) Office Action 2 for 201310124553.3 Jul. 8, 2015.

* cited by examiner

| Second users associated with a first game account | User IDs in voice communication group |
|---|---|
| ☒ User IDs in QQ communication tool<br>☐ User IDs in social space<br>☒ User IDs in game<br>[Confirm] [Cancel] | |

… (1)

COMMUNICATION METHOD, SYSTEM, SERVER AND CLIENT DEVICE FOR USER-INTERACTIVE SYSTEM

CROSS-REFERENCES TO RELATED APPLICATIONS

This application is a continuation application of PCT Patent Application No. PCT/CN2013/087817, filed on Nov. 26, 2013, which claims priority to Chinese Patent Application No. 201310124553.3, filed on Apr. 11, 2013, the entire contents of which are incorporated herein by reference.

FIELD OF THE DISCLOSURE

The present disclosure generally relates to communication technology and, more particularly, relates to communication methods, systems, servers and client devices in user-interactive system.

BACKGROUND

A user-interactive system usually includes a user-interactive client and a user-interactive server. A user can send a user message to the user-interactive server via the user-interactive client. The user-interactive server is configured to execute the user message. For example, in an online game system, a user can download a copy of a game from a user-interactive server via an online game client. In addition, via different online game clients, different users can perform a same task provided by the user-interactive server, such as battle task or team task.

In order to facilitate multiple online game clients to easily perform the same task, the user can perform text communication or voice communication with users corresponding to other online game clients that perform the same task, via a communication interface provided on the online game client. In addition, the user can also borrow third-party communication tools, such as instant messaging tools or social space (such as QQ space or microblog), to communicate with the other users for the task to perform. Thus, communication between the users for performing tasks is complicated.

BRIEF SUMMARY OF THE DISCLOSURE

One aspect of the present disclosure includes a communication method in a user-interactive system. The method can be implemented by a first user-interactive client. A communication interface can be started via the first user-interactive client by a first user in the user-interactive system, to communicate with one or more communication tools via a communication backend server. The first user can be associated with a first group of second users in the user-interactive system and the first user can have a first interactive-system ID. The first user can be associated with a second group of second users from the one or more communication tools and the first user can have a first communication-tool ID in a corresponding communication tool. The first user-interactive client can obtain and display, from the communication backend server, a plurality of second user IDs of second users. The second users can include the first group of second users in the user-interactive system, the second group of second users in the one or more communication tools, or a combination thereof. The first user-interactive client can receive one or more second user IDs selected from the plurality of second user IDs by the first user to add to a communication group. The first user-interactive client can further send, via the communication interface to the communication backend server, a message for joining the communication group containing the one or more second user IDs selected by the first user. An accepting message returned from the communication backend server according to the message for joining the communication group can be received. During a user-interactive operation, the first user-interactive client can communicate with a second client corresponding to a user ID contained in the accepting message.

Another aspect of the present disclosure includes a communication method in a user-interactive system. The method can be implemented by a computer system including a communication backend server. A plurality of second user IDs of second users can be sent to a first user-interactive client of a first user for displaying. The second users can include a first group of second users in the user-interactive system, a second group of second users from one or more communication tools, or a combination thereof. The first user can be associated with the first group of second users in the user-interactive system and the first user can have a first interactive-system ID. The first user can be associated with the second group of second users from the one or more communication tools and the first user can have a first communication-tool ID in a corresponding communication tool. A message for joining a communication group sent from the first user-interactive client can be received. The message for joining the communication group can contain one or more second user IDs selected by the first user selected from the plurality of second user IDs of the second users. The message for joining the communication group can be forwarded to a second client corresponding to one of the one or more second user IDs selected by the first user. An accepting message returned by the second client based on the message for joining the communication group can be received. The accepting message can be forwarded to the first user-interactive client, such that the first user-interactive client can communicate with the second client.

Another aspect of the present disclosure includes a client device in a user-interactive system. The device can include a user-ID-display unit, a selection-receiving unit, a joining-message-sending unit, and a communication unit. The user-ID-display unit can be configured to start a communication interface by a first user in the user-interactive system, to communicate with one or more communication tools via a communication backend server. The first user can be associated with a first group of second users in the user-interactive system and the first user can have a first interactive-system ID. The first user can be associated with a second group of second users from the one or more communication tools and the first user can have a first communication-tool ID in a corresponding communication tool. The user-ID-display unit can further be configured to obtain and display, from the communication backend server, a plurality of second user IDs of second users. The second users include the first group of second users in the user-interactive system, the second group of second users in the one or more communication tools, or a combination thereof. The selection-receiving unit can be configured to receive one or more second user IDs selected from the plurality of second user IDs by the first user to add to a communication group. The joining-message-sending unit can be configured to send, via the communication interface to the communication backend server, a message for joining the communication group containing the one or more second user IDs selected by the first user. The communication unit can be configured to, when receiving an accepting message returned from the communication backend server according to the message for joining the communication group, communicate with a second client corresponding to a user ID contained in the accepting message.

Another aspect of the present disclosure includes a server in a user-interactive system. The server can include a user-ID-sending unit, a joining-message-receiving unit, a joining-message-forwarding unit, and an accepting-message-forwarding unit. The user-ID-sending unit can be configured to send a plurality of second user IDs of second users to a first user-interactive client of a first user for displaying. The second users can include a first group of second users in the user-interactive system and a second group of second users from one or more communication tools, or a combination thereof. The first user can be associated with the first group of second users in the user-interactive system and the first user can have a first interactive-system ID. The first user can be associated with the second group of second users from the one or more communication tools and the first user can have a first communication-tool ID in a corresponding communication tool. The joining-message-receiving unit can be configured to receive a message for joining a communication group sent from the first user-interactive client. The message for joining the communication group can contain one or more second user IDs selected by the first user from the plurality of second user IDs of the second users. The joining-message-forwarding unit can be configured to forward the message for joining the communication group to a second client corresponding to one of the one or more second user IDs selected by the first user. The accepting-message-forwarding unit configured to, when receiving an accepting message returned by the second client based on the message for joining the communication group, forward the accepting message to the first user-interactive client, such that the first user-interactive client can communicate with the second client.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Figure 1:
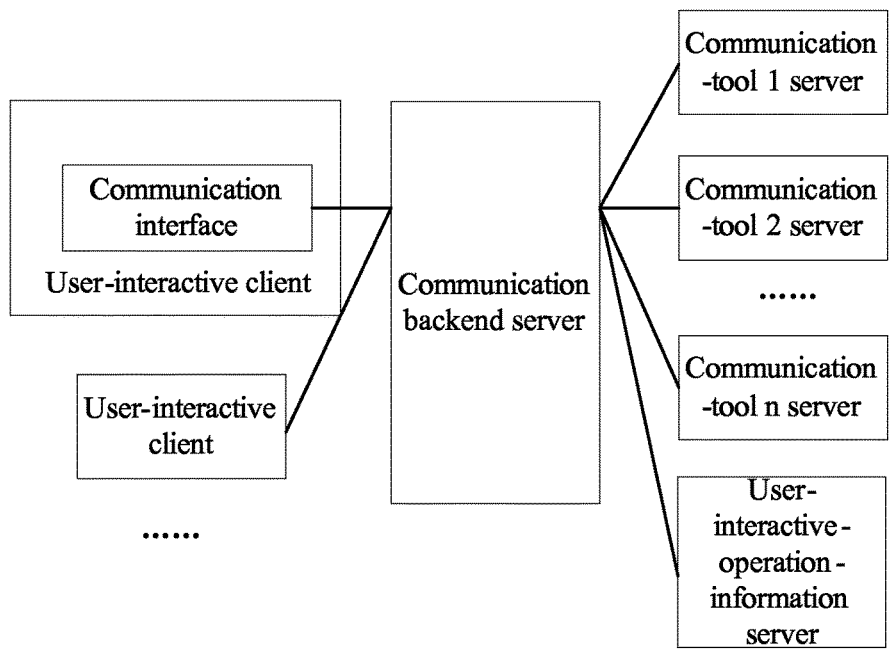
FIG. 1 depicts a structure diagram of an exemplary system incorporating a communication method in a user-interactive system in accordance with various disclosed embodiments.

Various embodiments provide communication methods in user-interactive system. FIG. 1 depicts a structure diagram of an exemplary system (or environment) incorporating a communication method in a user-interactive system in accordance with various disclosed embodiments. The system can include a plurality of user-interactive clients, a communication backend server, one of more communication-tool server, and/or a user-interactive-operation-information server.

As used herein, wherever applicable, unless otherwise specified, a client can include a computer system installed with a software/program of any suitable application, such that a user can request service from a server via the client for a certain application. A 'client' can be used interchangeably with a 'client device'. In practical applications, a client device can be implemented on any suitable computer system, e.g., a terminal or terminal device as described in the various embodiments in the present disclosure. For illustrative purposes, in various embodiments disclosed herein, one terminal can correspond to one client. So clients can be on separate hardware. However, according to needs of practical applications, multiple clients can reside in one terminal, without limitation.

In various embodiments, each user-interactive client can include a communication interface. A user can perform user-interactive operation with a user-interactive server via a user-interactive client. A user-interactive system can include any system that is implemented by a computer system that interacts with users via various means. Such a system can include, e.g., an online game system or any other suitable systems. A user-interactive operation can include any activities during the operating of the user-interactive system, e.g., running an online game, or any other suitable operations. A user-interactive server can include a server that implements the user-interactive system by communicating with one or more user-interactive clients.

For example, the user can download a copy of a game from an online game server or perform other tasks via an online game client. During that process, the user can initiate the communication interface via the user-interactive client, and perform communication (e.g., text communication or voice communication) with user-interactive clients of other users via the communication interface. In various embodiments, the communication interface can be configured in the user-interactive system in order to communicate with one or more communication tools via a communication backend server.

For clarity, as used herein, unless otherwise specified, the user of the communication interface via the user-interactive client can be referred to as a first user. Other users can be referred to as second users. The second users can include a first group of second users in the user-interactive system, and/or a second group of second users in one or more communication tools. User IDs of the second users can be referred to as second user IDs.

The first user can be associated with the first group of second users in the user-interactive system. Further, the first user can have a first interactive-system ID in the user-interactive system. The first interactive-system ID of the first user may also be referred to as a 'fourth user ID' of the first user.

The first user can also be associated with the second group of second users from the one or more communication tools. Further, the first user can have a first communication-tool ID in a corresponding communication tool. The first communication-tool ID of the first user may also be referred to as a 'third user ID' of the first user.

The communication backend server can be configured to provide second user IDs to the communication interface of the user-interactive client for displaying. The second user IDs can include second user IDs of second users associated with the user and stored on any one of the communication-tool servers, i.e., second user IDs of the second users from the second group of second users in one or more communication tools. The second user IDs can also include second user IDs of second users associated with the user and stored on the user-interactive-operation-information server, i.e., second user IDs of second users from the first group of second users in the user-interactive system. (In certain examples, as needed, 'second user IDs of the second users from the second group of second users in one or more communication tools' may be referred to as 'first user IDs of other users associated with the user and stored on any one of the communication-tool servers'. 'Second user IDs of second users from the first group of second users in the user-interactive system' may be referred to as 'second user IDs of other users associated with the user in the user-interactive system'.)

The communication backend server can be configured to connect the communication interface of the user-interactive client with various communication-tool servers, and to provide various types of user IDs to the user-interactive client. In various embodiments, the communication-tool server can include a computer system to implement certain method of communication between terminals/clients, or between terminal/client and the server. The various communication-tool servers can include, e.g., instant-communication-tool server(s) (e.g., QQ server, wherein QQ is a software program developed by Tencent Holdings Limited, located in Shenzhen, China), voice-communication-tool server (s), social-space server(s) (e.g., microblog server), any other suitable communication-tool server(s), or a combination thereof.

In various embodiments, the user-interactive-operation-information server is configured to store data related to the user during the user-interactive operation, including, e.g., user ID, IDs of other users that are related to the user ID and are performing a same task, progress of the user-interactive operation corresponding to the user ID, or any other suitable information. The user-interactive-operation-information server can be configured to function as a user-interactive server, or be separate from a user-interactive server, according to needs of practical applications. In the present disclosure, whenever applicable, unless otherwise specified, the user-interactive-operation-information server can be configured to further function as a server for clients to communicate with other clients in a communication group during user-interactive operation.

Figure 2:
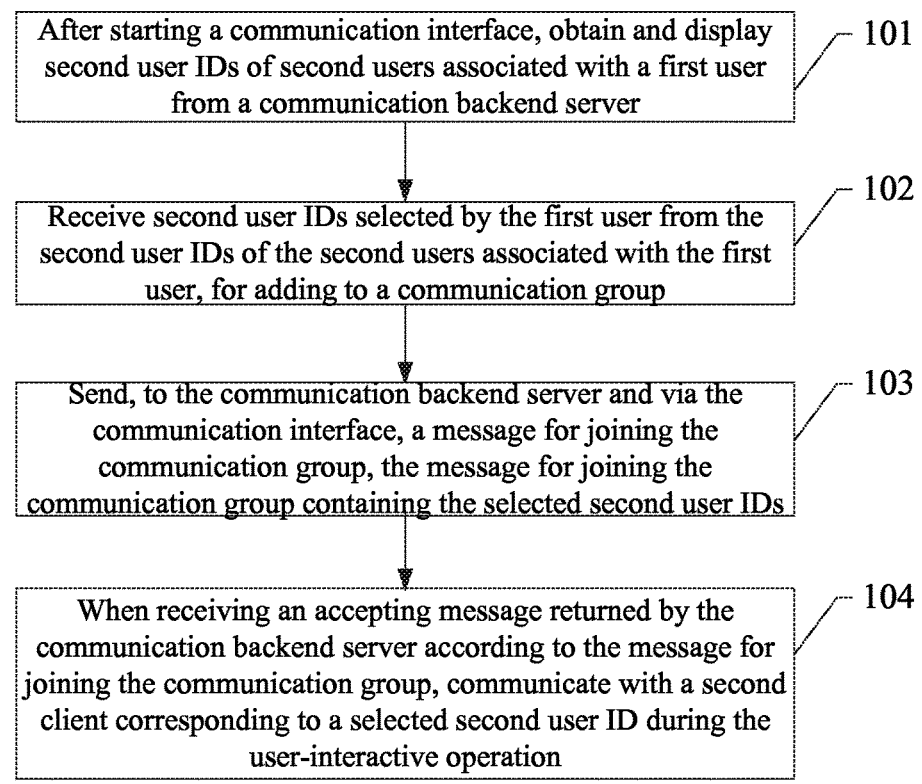
FIG. 2 depicts a flow diagram of an exemplary communication method implemented by a first user-interactive client device in accordance with various disclosed embodiments.

In one embodiment, a communication method disclosed herein can be implemented by any one of the user-interactive clients (e.g., a first user-interactive client) in the system (e.g., as shown in FIG. 1). For example, FIG. 2 depicts a flow diagram of an exemplary communication method implemented by a first user-interactive client device in accordance with various disclosed embodiments.

In Step 101, the first user-interactive client starts a communication interface, and obtains user identifiers (IDs) of second users from a communication backend server for displaying. The first user-interactive client can be used by a first user, and the second users can be associated with the first user. The user IDs of the second users associated with the first user can include second user IDs of second users from the second group of second users in one or more communication tools including, e.g., the user IDs of the other users associated with the first user in his/her QQ tool, the user IDs of the other users associated with the first user in his/her microblog (or microblog tool). In addition, or alternatively, the user IDs of the second users associated with the first user can include second user IDs of second users from the first group of second users in the user-interactive system, i.e., the user IDs of the other users associated with the first user, that are stored on a user-interactive-operation-information server. In this case, the second user IDs of the second users associated with the first user can include, e.g., the user IDs of the second users associated with the first user in a game system.

For example, the first user can click on a communication interface icon displayed on the first user-interactive client, in order to start the communication interface. A user (e.g., the first user) can have various user IDs in various communication tools (i.e., various first communication-tool IDs), and each first communication-tool ID can be associated with various user IDs of other users. The user can have different first communication-tool IDs for two different communication tools. For example, a first communication-tool ID of the user for a QQ tool can be different from a first communication-tool ID of the user for a microblog tool.

In one embodiment, after the communication interface is started, the first user-interactive client can log in the communication backend server using a first interactive-system ID of the first user in user-interactive operation, in order to obtain user IDs of other users associated with the first interactive-system ID. The communication backend server can obtain, from various communication-tool servers, online status of the second user IDs of the second users (from the second group of the second users) associated with the first interactive-system ID. In addition, the communication backend server can obtain, from the user-interactive-operation-information server, online status of the second user IDs of the second users (from the first group of the second users) associated with the first interactive-system ID. The communication backend server can then return to the first user-interactive client the second user IDs that are online, for displaying. As used herein, unless otherwise specified, the user IDs that are online can be referred to as "online user IDs".

In other embodiments, the communication backend server does not need to return to the first user-interactive client all the user IDs of the second users associated with the first interactive-system ID. Instead, after the first user-interactive client logs in the communication backend server using the first interactive-system ID, the communication backend server can provide the first user-interactive client with types of the user IDs of the second users associated with the first interactive-system ID. Thus, the first user-interactive client can display the types of the user IDs of the second users associated with the first interactive-system ID, in order for the user (e.g., the first user) to select. In various embodiments, a user ID of a certain type can refer to the second user IDs of the second users (from the second group of second users) associated with the first user under any one of the communication tools, or the second user IDs of the second users (from the first group of the second users) associated with the first user in the user-interactive system. Thus, the type of a user ID can include information including, e.g., the specific communication tool or the user-interactive system via which the other user is associated with the first user, and/or any other suitable information used for subsequent selecting of the user IDs by the first user.

In this case, when the first user-interactive client receives types selected by the first user from the types of the user IDs, the first user-interactive client can obtain, from the communication backend server, the user IDs (of the other users associated with the first user) that belong to the selected types. The communication backend server can then obtain the online status of the user IDs (of the other users associated with the first user) that belong to the selected types, from a corresponding server, and can return the online user IDs to the first user-interactive client for displaying.

In Step 102, the first user-interactive client receives user IDs selected by the first user from the user IDs of the second users associated with the first user, for adding to a communication group including, e.g., a voice communication group, and/or a text communication group, etc. Thus, each user corresponding to a user ID can know communication information of users corresponding to other user IDs.

In Step 103, the first user-interactive client sends, to the communication backend server via the communication interface, a message for joining the communication group. The message for joining the communication group can be a message indicating that the selected user IDs are invited to join the communication group. The message for joining the communication group can contain information including, e.g., the selected user IDs. The communication backend server can forward to second clients the message for joining the communication group. The second clients can correspond to the selected user IDs. The second clients can then provide users with a user interface for prompting whether to accept an invitation. When the user accepts the invitation, the second clients can send accepting messages respectively to the first user-interactive client. For example, each of the second clients can send an accepting message to the first user-interactive client.

It should be noted that, in one example, the second clients can include second user-interactive clients. That is, one or more of the other users corresponding to the user IDs selected by the first user can be in the same user-interactive operation with the first user. In this case, the communication backend server can directly send, to the second user-interactive clients, the message for joining the communication group.

In another example, the second clients can include clients for any communication tool associated with the first user. That is, one or more of the other users corresponding to the user IDs selected by the first user are not in the same user-interactive operation with the first user. In this case, the communication backend server can send to the second clients, via any suitable communication tool, the message for joining the communication group. Thus, under (i.e., via) a server of the communication tool, the second client can provide the users with a user interface for prompting whether to accept an invitation to join the user-interactive operation and to communicate with the first user-interactive client.

When the users (i.e., the users of the second clients) choose to accept the invitation, the second clients can send accepting message respectively to the communication backend server via the server of the communication tool. Next, the accepting messages can be sent to the first user-interactive client. Meanwhile, the second clients can log in the user-interactive-operation-information server, and wait to communicate with clients corresponding to the user IDs in the communication group. For illustrative purposes, multiple second users, multiple (selected) types of user IDs, multiple second clients, and multiple accepting messages, etc. are depicted in the above example or elsewhere in the present disclosure. However, there can be one second user, one (selected) type of user IDs, one second client, and/or one accepting message, etc., that can be implemented accordingly, using similar or same steps as depicted in this disclosure, without limitation.

In Step 104, when the first user-interactive client receives accepting messages returned by the communication backend server according to the message for joining the communication group, the first user-interactive client communicates with the second clients corresponding to the selected user IDs during the user-interactive operation.

In the communication methods according to various disclosed embodiments, by starting a communication interface, a first user-interactive client can obtain user IDs of second users from a communication backend server. The second users can be associated with a first user that the first user-interactive client belongs to. The user IDs of the second users associated with the first user can include second user IDs of second users associated with the first user in one or more communication tools, and/or second user IDs of second users associated with the first user in the user-interactive system. Thus, the first user-interactive client can add, to a communication group, user IDs selected by the first user from the user IDs of the second users associated with the first user, and can communicate with second clients corresponding to user IDs in the communication group during the user-interactive operation.

Therefore, a user can communicate with other users via a communication interface provided on a user-interactive client, and does not need to communicate with other users via a third-party communication tool. Communication between users can thus become simpler. In addition, the communication backend server can integrate user IDs of other users of various types associated with the first user, and can send the user IDs to the user-interactive client for displaying. Thus, the process of communicating with other users via a third-party communication tool can further be saved.

Figure 3:
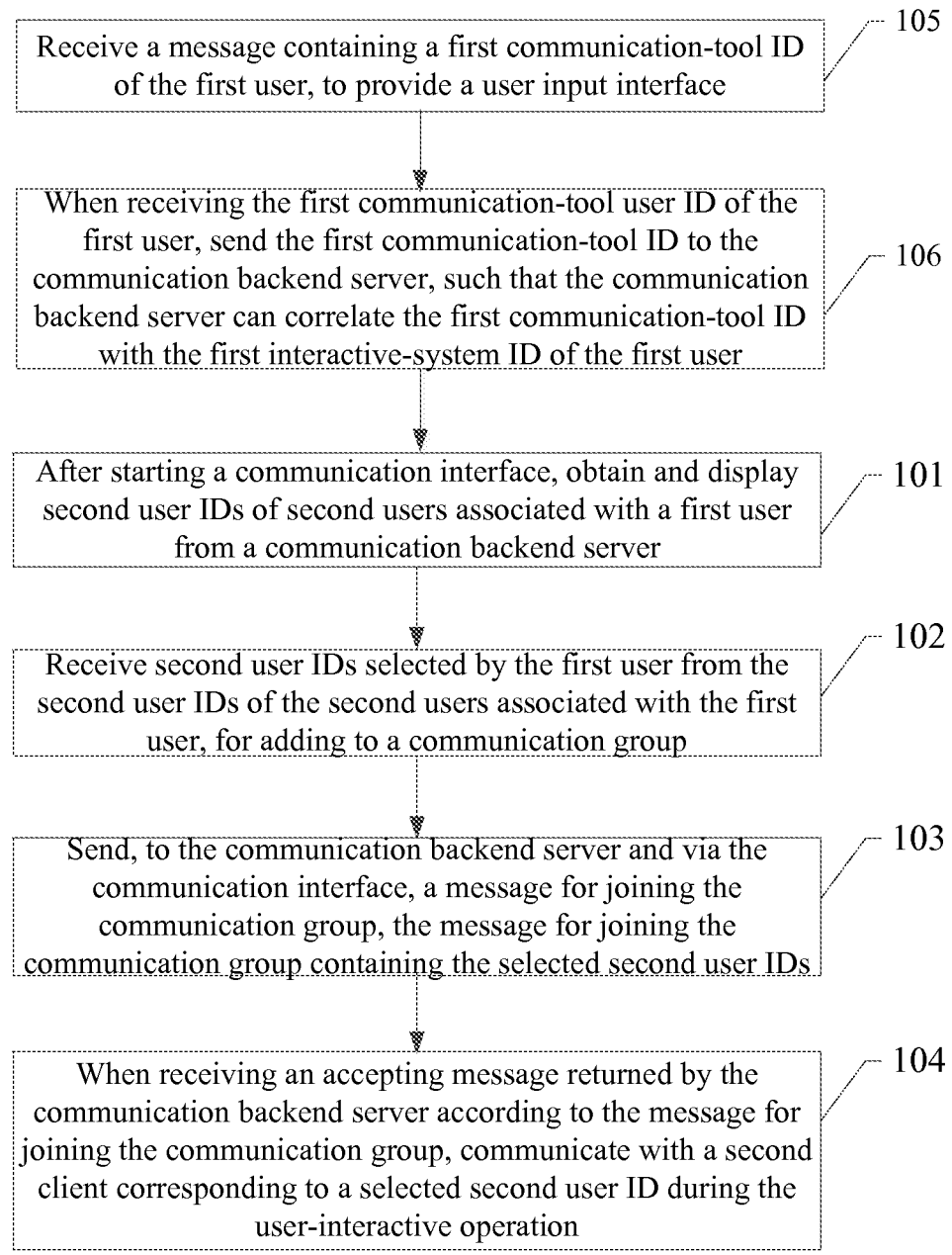
FIG. 3 depicts a flow diagram of another exemplary communication method implemented by a first user-interactive client device in accordance with various disclosed embodiments.

It should be noted that, in various embodiments (e.g., as shown in the above Steps 101-104), the first user-interactive client can communicate with the second clients corresponding to the user IDs of the other users of various types that are associated with the first user. The user IDs (i.e., of the other users of various types that are associated with the first user) may need to be preset via the first user-interactive client before performing Step 101. For example, FIG. 3 depicts a flow diagram of another exemplary communication method implemented by a first user-interactive client in accordance with various disclosed embodiments. The steps can include the following.

In Step 105, the first user-interactive client receives a message containing a user ID of the first user, and provides a user input interface. The user ID of the first user is associated with the first user, and can be of any type. For example, the user (e.g., the first user) can click on an icon of the user input interface (i.e., an icon configured with the user input interface) displayed on the first user-interactive client, to send to the first user-interactive client the message containing the user ID of the first user associated with the first user. The user ID of the first user can be of any type. The message can further type information of the user ID, e.g., the communication tool that the user ID is under, etc.

In Step 106, when the first user-interactive client receives a first communication-tool ID of the first user of any type from the user input interface, the first user-interactive client sends the first communication-tool ID to the communication backend server, such that the communication backend server can correlate the first communication-tool ID with the first interactive-system ID of the first user in the user-interactive operation. Therefore, the second user IDs of the second users obtained as above in various embodiments (e.g., in Step 101) can include the second user IDs of the second users associated with the first communication-tool ID of the first user (e.g., from the second group of the second users). In various embodiments, the first communication-tool ID of the first user can be the user ID of the first user of any type that is contained in the message received by the first user-interactive client when the user input interface is provided.

In various embodiments, one user (e.g., the first user) can have different user IDs under different communication tools. For example, a user ID of the user (e.g., the first user) under a QQ tool can be different from a user ID of the user (e.g., the first user) under a microblog tool. Thus, the first interactive-system ID of the first user in the user-interactive operation needs to be correlated with the various user IDs of the first user (e.g., the first communication-tool ID), in order to obtain the second user IDs of the second users associated with the first user.

It should be noted that, the first user and the second users, the first user-interactive client and the second user-interactive clients, and the first user ID to the first interactive-system ID, are not indicating sequential relationships, but are used for illustrating different users, different user-interactive clients, and different user IDs, respectively.

Figure 4:
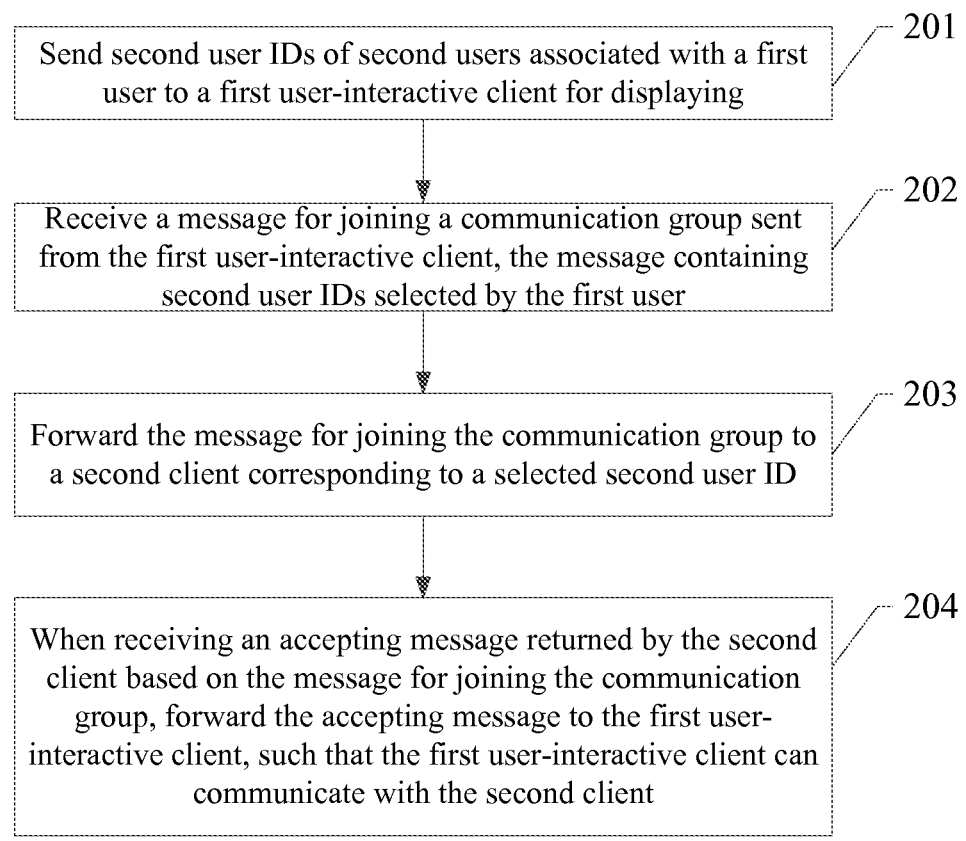
FIG. 4 depicts a flow diagram of an exemplary communication method implemented by a communication backend server in accordance with various disclosed embodiments.

Various embodiments further provide communication methods in a user-interactive system. The communication methods can be implemented in a system in accordance with various embodiments (e.g., the system as shown in FIG. 1). An exemplary method can be implemented by a communication backend server (e.g., as in FIG. 1). FIG. 4 depicts a flow diagram of an exemplary communication method implemented by a communication backend server in accordance with various disclosed embodiments.

In Step 201, a communication backend server sends second user IDs of second users to a first user-interactive client for displaying. The first user-interactive client can be used by a first user, and the second users can be associated with the first user. The user IDs of the second users associated with the first user can include, e.g., second user IDs of second users associated with the first user in one or more communication tools (i.e., from the second group of the second users), and/or second user IDs of second users associated with the first user in the user-interactive system (i.e., from the first group of the second users).

In various embodiments, the first user-interactive client can log in the communication backend server using a first interactive-system ID of the first user in user-interactive operation, in order to obtain user IDs of other users associated with the first interactive-system ID. The communication backend server can obtain, from various communication-tool servers, online status of the second user IDs of the second users (from the first group of the second users) associated with the first interactive-system ID. In addition, the communication backend server can obtain, from the user-interactive-operation-information server, online status of the second user IDs of the second users (from the second group of the second users) associated with the first interactive-system ID. The communication backend server can then return online user IDs to the first user-interactive client for displaying.

In other embodiments, the communication backend server does not need to return to the first user-interactive client all the user IDs of the second users associated with the first interactive-system ID. Instead, after the first user-interactive client logs in the communication backend server using the first interactive-system ID, the communication backend server can provide the first user-interactive client with types of the second user IDs of the second users associated with the first interactive-system ID, in order for the user (e.g., the first user) to select. In various embodiments, a user ID of a certain type can refer to the second user IDs of the second users (from the second group of the second users) associated with the first user under any one of the communication tools, or the second user IDs of the second users (from the first group of the second users) associated with the first user in the user-interactive system. Thus, the type of a user ID can include information including, e.g., the specific communication tool or the user-interactive system via which the other user is associated with the first user, and/or any other suitable information for subsequent selecting of the user IDs by the first user.

In this case, when the communication backend server receives types selected by the first user from the types of the user IDs and sent by the first user-interactive client, the communication backend server can obtain the online status of the user IDs (of the other users associated with the first user) that belong to the selected types, from a corresponding server, and can return the online user IDs to the first user-interactive client for displaying.

It should be noted that, before performing Step 201, the first user may need to associate beforehand the first user with the user IDs of the second users of various types via the first user-interactive client. For example, the first user-interactive client can send a first communication-tool ID of the first user of any type to the communication backend server, such that the communication backend server can correlate the first communication-tool ID with the first interactive-system ID of the first user in the user-interactive operation. Therefore, the user IDs of the second users obtained as above in various embodiments (e.g., in Step 201) can include the user IDs of the other users associated with the first communication-tool ID of the first user.

In Step 202, the communication backend server receives a message for joining a communication group sent from the first user-interactive client. The message for joining the communication group can contain information including, e.g., one or more second user IDs selected by the first user from the second user IDs of the second users.

In Step 203, the communication backend server forwards the message for joining the communication group to second clients corresponding to the selected user IDs.

It should be noted that, in one example, the second clients can include second user-interactive clients. That is, one or more of the other users corresponding to the user IDs selected by the first user can be in the same user-interactive operation with the first user. In this case, the communication backend server can directly forward, to the second user-interactive clients, the message for joining the communication group.

In another example, the second clients can include clients for any communication tool associated with the first user. That is, one or more of the other users corresponding to the user IDs selected by the first user are not in the same user-interactive operation with the first user. In this case, the communication backend server can send to the second clients, via any suitable communication tool, the message for joining the communication group. Thus, under (i.e., via) a server of the communication tool, the second clients can provide the users with a user interface for prompting whether to accept an invitation to join the user-interactive operation and to communicate with the first user-interactive client.

When the users (i.e., the users of the second clients) choose to accept the invitation, the second clients can respectively send accepting messages to the communication backend server via the servers of the communication tools. Next, the accepting messages can be sent to the first user-interactive client. Meanwhile, the second client can log in the user-interactive-operation-information server, and wait to communicate with the clients corresponding to the user IDs in the communication group.

In Step 204, when the communication backend server receives the accepting messages returned by the second clients based on the message for joining the communication group, the communication backend server forwards the accepting messages to the first user-interactive client, such that the first user-interactive client can communicate with the second clients.

In the communication methods according to various disclosed embodiments, a communication backend server can send user IDs of second users to a first user-interactive client for displaying. The second users can be associated with a first user that the first user-interactive client belongs to. The user IDs of the second users associated with the first user can include second user IDs of second users associated with the first user in one or more communication tools, and/or second user IDs of second users associated with the first user in a user-interactive system. Thus, the first user-interactive client can add, to a communication group, user IDs selected by the first user from the user IDs of the second users associated with the first user, and can communicate with second clients corresponding to the user IDs in the communication group during the user-interactive operation.

Therefore, a user can communicate with other users via a communication interface provided on a user-interactive client, and does not need to communicate with other users via a third-party communication tool. Communication between users can thus become simpler. In addition, the communication backend server can integrate user IDs of other users of various types associated with the first user, and can send the user IDs to the user-interactive client for displaying. Thus, the process of communicating with other users via a third-party communication tool can further be saved.

The communication methods according to various disclosed embodiments can be further illustrated by using a practical example as follows. In one embodiment, the first user-interactive client can include a game client of a 'Hero League'. The user-interactive operation can be a Hero League game. A communication interface icon can be displayed on the game client. After a user clicks on the communication interface icon, the communication interface is then started.

In this case, a communication backend server can be provided with the following functions. For example, the communication backend server can have Tconnd access to ensure connection with the communication interface of the game client, and to establish a communication channel between the communication interfaces of the game clients. The communication backend server can have Cross access including, e.g., user authentication, etc. The communication backend server can be provided with configuration service, i.e., for issuing related configuration information to the communication interface of the game client including, e.g., user ID(s) associated with a user, and/or other suitable information. The communication backend server can be provided with game data service, i.e., for obtaining the user's game data, the user ID(s) of the user in the game, etc. The communication backend server can further be provided with communication data service, i.e., for receiving and forwarding messages between the communication interfaces of the game clients. The communication backend server can further be provided with status service, i.e., for obtaining online status information of user IDs associated with users.

Figure 5:
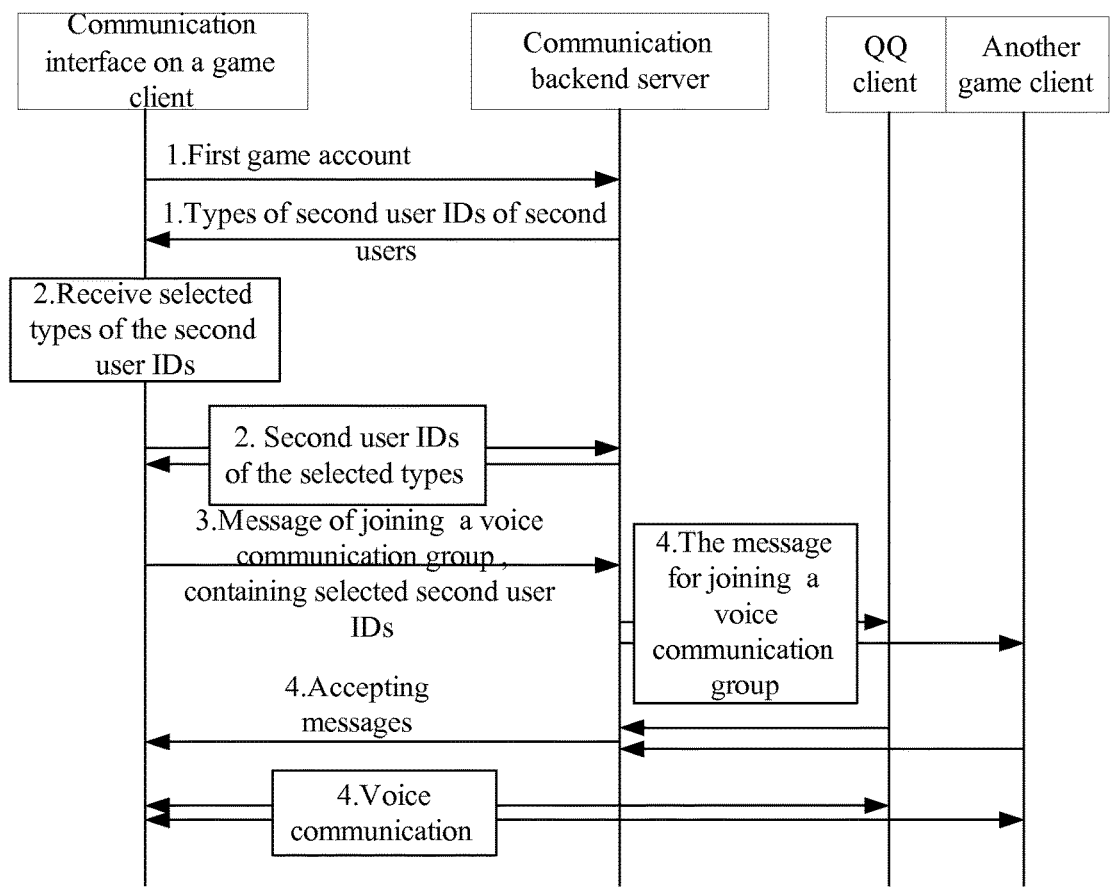
FIG. 5 depicts a schematic of exemplary voice communication in a game system in accordance with various disclosed embodiments.

In this example, voice communication can be performed in the game system using the methods depicted as the following. For example, FIG. 5 depicts a schematic of exemplary voice communication in a game system in accordance with various disclosed embodiments.

Figures 6A, 6B:
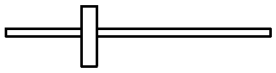
FIG. 6a depicts a first user interface containing types of second user IDs of second users displayed by an exemplary game client device in accordance with various disclosed embodiments.
FIG. 6b depicts a second user interface containing second user IDs of second users of selected types, displayed by an exemplary game client device in accordance with various disclosed embodiments.

In Step 1, a first game user starts a communication interface by operating the game client. The game client can then log in a communication backend server using a first game account, e.g., a first interactive-system ID as depicted in various embodiments. The first game account can be an account of the first user in the game. The communication backend server can send user IDs of second users to the game client. The second users can be associated with the first game account. A first user interface (e.g., as shown in FIG. 6a) can be displayed on the game client.

For example, on the first user interface, there can be included the first game account, types of the user IDs of the second users associated with the first user including, e.g., QQ-communication-tool type, social-space type, current-game type, etc. In one embodiment, the first user can select from selection boxes preceding the types of the user IDs on the first user interface. For example, the first user can select the QQ-communication-tool type and the current-game type, and click on a 'confirm' button. The types of the user IDs selected by the first game user can then be sent to the game client.

In Step 2, when the game client receives the types selected by the first game user from types of the user IDs of the second users, the game client can obtain, from the communication backend server, the user IDs (of the other users associated with the first game account) that belong to the selected types. The communication backend server can obtain the online status of the user IDs (of the other users, i.e., of the second users associated with the first game account) from a QQ-communication-tool server, obtain the online status of the user IDs (of the other users, i.e., of the second users associated with the first game account) from a game-information server, and send online user IDs to the game client for displaying.

In Step 3, the first game user selects one or more second user IDs for adding to a voice communication group, from the second user IDs of the second users that are displayed on the game terminal. The first game user can then send to the communication backend server a message for joining the voice communication group. The message for joining the voice communication group can contain the selected second user IDs.

For example, the game client can display a second user interface as shown in FIG. 6b. The second user interface can include the user IDs of the other users that are associated with the first game user, which are of the types selected by the first game user and are online. In addition, the second user interface can have information, e.g., types of each of the user IDs, the user IDs for adding to the voice communication group, adjusting volume of voice communication, etc. On the second user interface, the first game user can click on buttons of selecting to add to the voice communication group. Such buttons may be configured as following the user IDs (e.g., "+" buttons in FIG. 6b). In the example shown in FIG. 6, user IDs 1 and 5 are selected, and the game client can send the user IDs 1 and 5 to the communication backend server via the message for joining the voice communication group.

In Step 4, the communication backend server can send the message for joining the voice communication group to a QQ client corresponding to the user ID 1, via a QQ-communication-tool server. The QQ client can then provide the user (the user corresponding to the user ID 1) with a user interface for prompting whether to accept an invitation to join the game and communicate with the game client of the first game user. The communication backend server can directly send the message for joining the voice communication group to a game client corresponding to the user ID 5. After the communication backend server receives accepting messages from the two clients (e.g., the QQ client corresponding to the user ID 1, and the game client corresponding to the user ID 5), the communication backend server can forward the accepting messages to the game client of the first game user. Thus, the communication interface on the game client of the first game user can perform (i.e., can be used to perform) voice communication with the clients corresponding to the user IDs 1 and 5 in the voice communication group. Further, the first game user can adjust information including, e.g., the volume during the voice communication.

Figure 7:
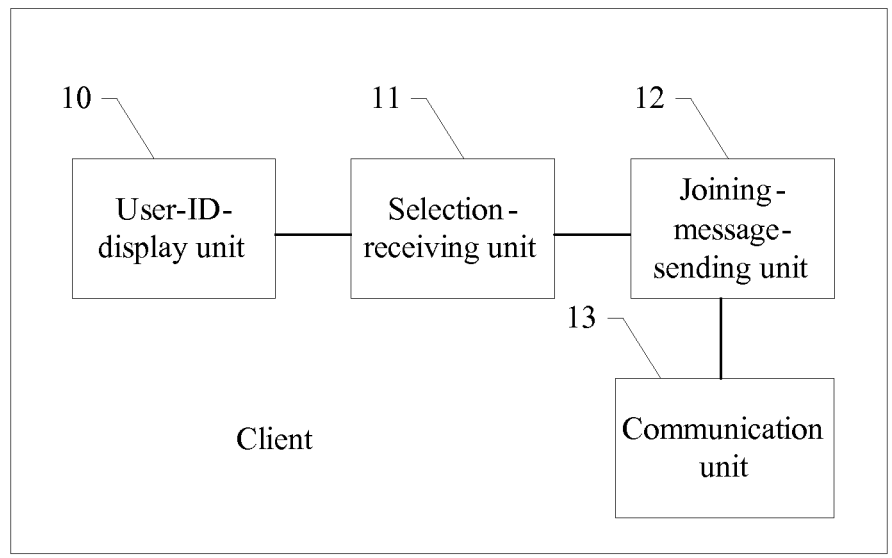
FIG. 7 depicts a structure diagram of an exemplary client device in accordance with various disclosed embodiments.

Various embodiments further provide a client device, including, e.g., the first user-interactive client according to various embodiments described above, and units of the client can communicate with each other using the methods as disclosed herein (e.g., as shown in FIGS. 2-3). FIG. 7 depicts a structure diagram of an exemplary client in accordance with various disclosed embodiments. The client can include a user-ID-display unit 10, a selection-receiving unit 11, a joining-message-sending unit 12, and/or a communication unit 13. Certain units may be omitted and other units may be included.

The user-ID-display unit 10 is configured to, after starting a communication interface, obtain user IDs of second users from a communication backend server for displaying. The first user-interactive client can belong to a first user, and the second users can be associated with the first user. The user IDs of the second users associated with the first user can include second user IDs of second users associated with the first user in one or more communication tools, and/or second user IDs of second users associated with the first user in the user-interactive system. It should be noted that, the user IDs of the second users that the user-ID-display unit 10 is configured to receive can be the user IDs that are online.

For example, after the communication interface is started, the user-ID-display unit 10 can log in the communication backend server using a first interactive-system ID of the first user in user-interactive operation, and can obtain the second user IDs of the second users returned by the communication backend server. The obtained second user IDs of the second users are associated with the first interactive-system ID and are online.

The selection-receiving unit 11 is configured to receive user IDs selected by the first user for adding to a communication group. The user IDs selected by the first user can be selected from the user IDs of the second users associated with the first user that are displayed using the user-ID-display unit 10.

The joining-message-sending unit 12 is configured to send, to the communication backend server via the communication interface, a message for joining the communication group. The message for joining the communication group can contain information including, e.g., the user IDs selected by the first user that are received by the selection-receiving unit 11.

The communication unit 13 is configured to communicate with second clients corresponding to the selected user IDs during the user-interactive operation, after receiving accepting messages returned by the communication backend server according to the message for joining the communication group sent by the joining-message-sending unit 12.

In the client in accordance with various embodiments, by starting a communication interface, a user-ID-display unit 10 can obtain user IDs of second users from a communication backend server. The second users can be associated with a first user that a first user-interactive client belongs to. The user IDs of the second users associated with the first user can include second user IDs of second users associated with the first user in one or more communication tools, and/or second user IDs of second users associated with the first user in the user-interactive system. Thus, the joining-message-sending unit 12 can add, to a communication group, users IDs selected by the first user from the user IDs of the second users associated with the first user. During the user-interactive operation, the communication unit 13 can communicate with second clients corresponding to the selected user IDs in the communication group.

Therefore, a user can communicate with other users via a communication interface provided on a user-interactive client, and does not need to communicate with other users via a third-party communication tool. Communication between users can thus become simpler. In addition, the communication backend server can integrate user IDs of other users of various types associated with the first user, and can send the user IDs to the user-interactive client for displaying. Thus, the process of communicating with other users via a third-party communication tool can further be saved.

Figure 8:
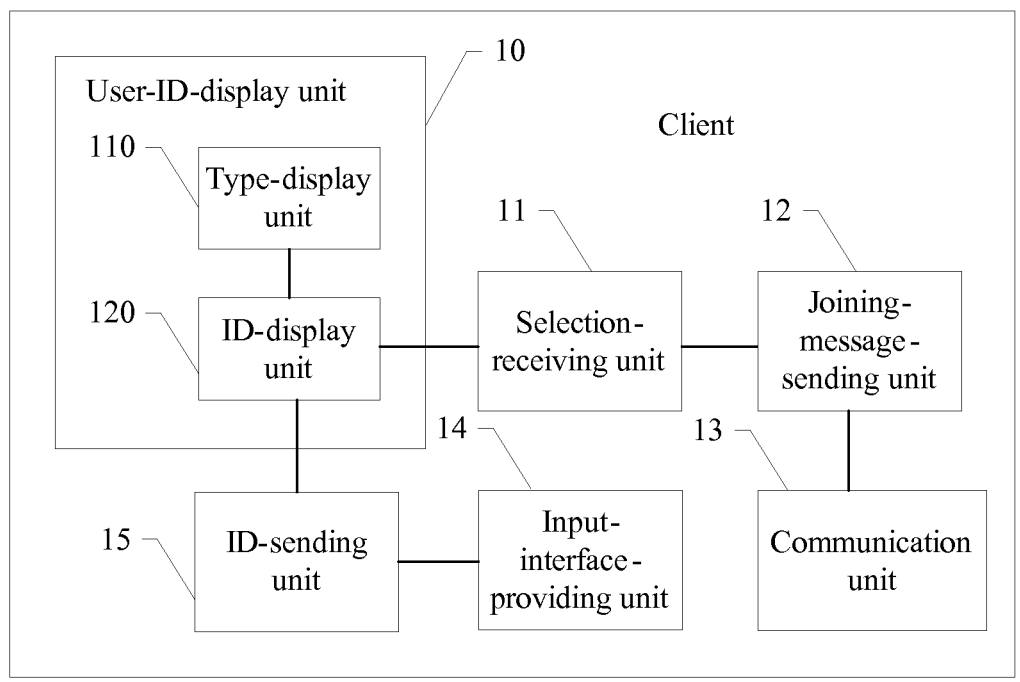
FIG. 8 depicts a structure diagram of another exemplary client device in accordance with various disclosed embodiments.

FIG. 8 depicts a structure diagram of another exemplary terminal in accordance with various disclosed embodiments. In one embodiment, in addition to the structure depicted in various embodiments (e.g., as shown in FIG. 7), the client can further include an input-interface-providing unit 14, and/or an identification-sending unit 15 (or ID-sending unit 15). The user-ID-display unit 10 can include (i.e., be implemented by) a type-display unit 110 and/or an identification-display unit 120 (or ID-display unit 120).

The type-display unit 110 is configured to, after the communication interface is started, display types of the user IDs of the second users associated with the first user provided by the communication backend server, in order for the first user to select. For example, after the communication interface is started, the type-display unit 110 can log in the communication backend server using a first interactive-system ID of the first user in user-interactive operation, in order to obtain the types of the user IDs of the second users returned by the communication backend server that are online. The ID-display unit 120 is configured to obtain, from the communication backend server, the user IDs (of the other users associated with the first user) that belong to the selected types for displaying, when receiving the types selected by the first user from the types of the user IDs displayed by the type-display unit 110.

The input-interface-providing unit 14 is configured to receive a message containing a user ID of the first user, and to provide a user input interface. The user ID of the first user is associated with the first user, and can be of any type. In various embodiments, the user ID of the first user of any type can include a first communication-tool ID of the first user in a corresponding communication tool.

The ID-sending unit 15 is configured to, when receiving a first communication-tool ID of the first user of any type from the user input interface provided by the input-interface-providing unit 14, send the first communication-tool ID to the communication backend server, such that the communication backend server can correlate the first communication-tool ID with the first interactive-system ID of the first user in the user-interactive operation. The user IDs of the second users displayed by the ID-display unit 120 of the user-ID-display unit 10 can include the user IDs of the other users associated with the first communication-tool ID.

Using the client according to various embodiments, after the user IDs of the second users associated with the first user are displayed via the type-display unit 110 and the identification-display unit 120, the selection-receiving unit 11 can receive the user IDs selected by the first user from the user IDs displayed by the ID-display unit 120. Further, via the joining-message-sending unit 12 and the communication unit 13, multi-party communication can be realized on the client without the need to use a third-party communication tool.

For illustrative purposes, in the following example, the communication method in a user-interactive system as disclosed herein can be implemented by a terminal. The terminal can include, e.g., smart phone, tablet computer, e-book reader, Moving Picture experts Group Audio Layer III (MP3) player, Moving Picture Experts Group Audio Layer IV (MP4) players, portable laptop computer, desktop computer, etc.

Figure 9:
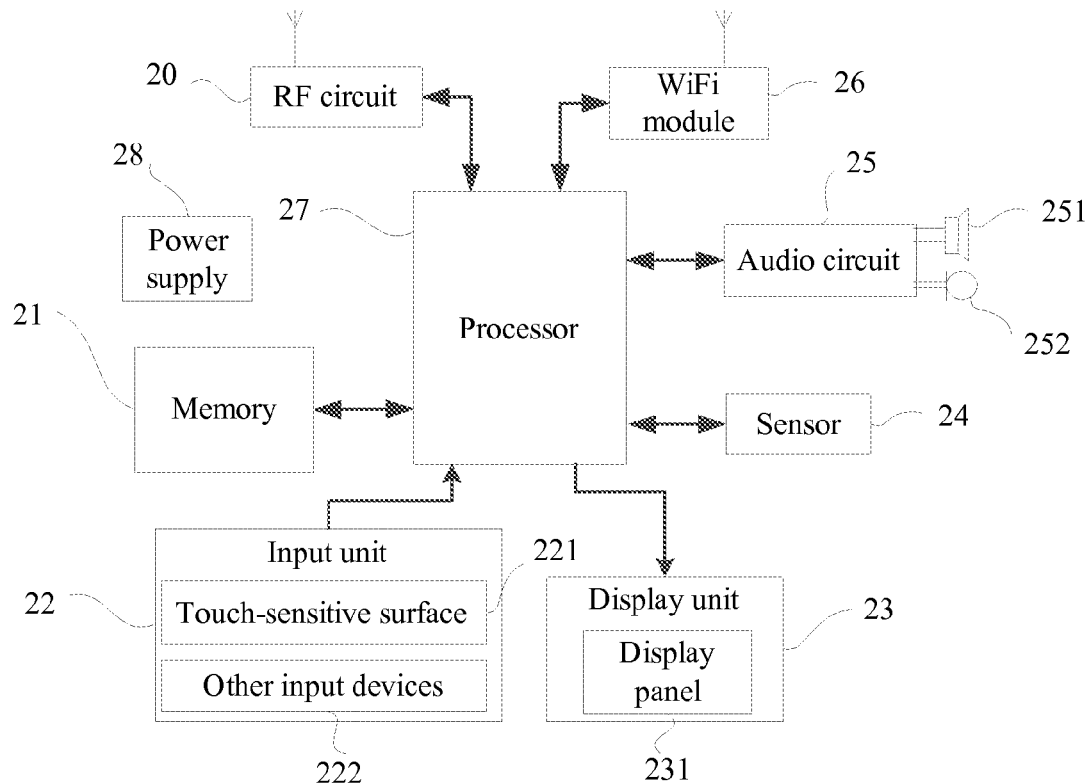
FIG. 9 depicts a structure diagram of an exemplary terminal incorporating certain communication methods in user-interactive system in accordance with various disclosed embodiments.

FIG. 9 depicts a structure diagram of an exemplary terminal incorporating certain communication methods in a user-interactive system in accordance with various disclosed embodiments. The terminal may include a radio frequency (RF) circuit 20, a memory 21 including one or more computer-readable storage media, an input unit 22, a display unit 23, a sensor 24, an audio circuit 25, a wireless fidelity (WiFi) module 26, a processor 27 including one or more processing cores, a power supply 28, and/or other components. The structure of the terminal depicted in FIG. 9 is for illustrative purposes only and does not limit the terminal. More or less than the components illustrated in FIG. 9 can be included, certain components can be combined, and arrangement of the components can be different.

The RF circuit 20 can be used to receive and transmit signals during receiving and transmission of information. For example, the RF circuit 20 can be configured to receive base station downlink information to send the same to the one or more processors 27 for processing, and further, to send data related to uplink to the base station. Generally, the RF circuit 20 can include, but not limited to, antenna, at least one amplifier, a tuner, one or more oscillators, subscriber identity module (SIM) card, transceiver, coupler, low noise amplifier (LNA), duplexer, etc. In addition, the RF circuit 20 can communicate with network and other devices via wireless communication. The wireless communication can use any communication standard or protocol including, but not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), etc.

The memory 21 is configured to store software programs and/or modules. By running or executing the software programs and/or modules stored in the memory 21, and by retrieving data stored in the memory 21, the processor 27 can perform various functions of the server and process data. The memory 21 may include a storage program area and a storage data area. The storage program area is configured to store operating systems and application programs required by one or more functions (e.g., sound playback, image playback, etc.) or any other suitable programs for storing. The storage data area is configured to store data created based on usage of the server (e.g., audio data, phone book, etc.). Further, the memory 21 can include high-speed random access memory (RAM) and/or non-volatile memory, e.g., one or more disk storage devices, flash memory devices, and/or other volatile solid-state memory devices. Accordingly, the memory 21 may also include a memory controller to provide the processor 27 with access to the memory 21.

The input unit 22 can be configured to receive inputted numbers or character information, and to generate signal input (e.g., keyboard, mouse, joystick, optical or trackball signal input) related to user settings and functional control. For example, in one embodiment, the input unit 22 may include a touch-sensitive surface 221, and/or other input devices 222. The touch-sensitive surface 221, also known as a touch screen or touch panel, can be configured to collect touch operations by a user on or near it (e.g., operations on or near the touch-sensitive surface 221 from the user by using finger(s), a stylus, and/or any other suitable objects or accessories), and to drive corresponding connected apparatus according to preset programs. Optionally, the touch-sensitive surface 221 may include two parts including a touch detection apparatus and a touch controller. The touch detection apparatus is configured to detect the user's touch position, detect a signal generated by the touch operation, and send the signal to the touch controller. The touch controller is configured to receive touch information from the touch detection apparatus, convert it into contact point coordinates, send the coordinates to the processor 501, and receive commands sent by the processor 27 for executing. Furthermore, the touch-sensitive surface 221 can have various types including, e.g., resistive, capacitive, infrared, surface acoustic wave, etc. In addition to the touch-sensitive surface 221, the input unit 22 may further include other input devices including, but not limited to, e.g., one or more of physical keyboard, function keys (e.g., volume control keys, switch keys, etc.), trackball, mouse, joystick, etc.

The display unit 23 is configured to display information entered by the user, information provided for the user, or various graphical user interfaces of the terminal. The graphical user interfaces can be formed by graphics, text, icons, videos, or a combination thereof. The display unit 23 may include a display panel 231, optionally, configured using liquid-crystal display (LCD), organic light-emitting diode (OLED) and/or any other suitable display methods. Further, the touch-sensitive surface 221 can cover the display panel 231. When the touch-sensitive surface 221 detects a touch operation on or near it, the touch-sensitive surface 221 can process the touch operation to generate data, and send the data to the processor 27 to determine the type of the touch event. The processor 27 can then provide a corresponding visual output on the display panel, according to the type of the touch event. Although the touch-sensitive surface 221 and the display panel 231 are depicted in FIG. 9 as two separate components to achieve input and output functions, in various embodiments, the touch-sensitive surface 221 can be integrated with the display panel 231 for the input and output functions.

The terminal may further comprise one or more sensors 24 including, e.g., light sensor, motion sensor, and/or other sensors. The light sensor may include an ambient light sensor and/or a proximity sensor. The ambient light sensor can adjust brightness of the display panel 231 according to the brightness of ambient light. The proximity sensor can turn off the display panel 231 and/or backlighting when the terminal is moved to be close to ear. As a type of motion sensor, a gravity acceleration sensor may detect magnitude of acceleration in each direction (e.g., three-axis), and can detect magnitude and direction of gravity when still. Thus, the gravity acceleration sensor can be configured for applications of identify mobile phone postures (e.g., switching between horizontal and vertical screens, related games, magnetometer posture calibration), functions related to vibration recognition (e.g., pedometer, percussion), etc. The terminal can also be configured with gyroscope, barometer, hygrometer, thermometer, infrared sensor and other sensors.

The audio circuit 25, coupled with a speaker 251, a microphone 252 can provide an audio interface between the user and the terminal. The audio circuit 25 is configured to transmit to the speaker 251 an electrical signal after a conversion from received audio data. The speaker 251 is configured to convert the electrical signal to audio signal output. On the other hand, the microphone 252 is configured to convert collected audio signal to an electrical signal. The audio circuit 25 can receive the electrical signal for converting to audio data. The audio circuit 25 can output the audio data to the processor 27 for processing, and the processed audio data can be sent to another terminal via the RF circuit 20. Alternatively, the audio data can be outputted to the memory 21 for further processing. The audio circuit 25 may also include an earphone jack to provide communication between a peripheral headset and the terminal.

WiFi is a short-range wireless transmission technology. The terminal can receive/send e-mail, browse web pages, and access streaming media, etc., via the WiFi module 26. The WiFi module 26 can be configured to provide wireless broadband Internet access. Although the WiFi module 26 is depicted in FIG. 9, it is not essential to the terminal, and can be omitted according to practical applications, without limitation.

The processor 27 can be a control center of the terminal, and can be configured to connect various components of the terminal using various interfaces and circuits. By running or executing software programs and/or modules stored in the memory 21, and by retrieving data stored in the memory 21, the processor 27 can be configured to perform various functions of the terminal and process data in order for an overall control of the terminal (e.g., mobile phone). Optionally, the processor 27 may contain one or more processing cores. Optionally, the processor 27 may integrate an application processor and a modem processor. The application processor can be configured to mainly process operating systems, user interfaces and application programs, etc. The modem processor can be configured to mainly process wireless communications. Optionally, the modem processor is not integrated into the processor 27.

The terminal can further include a power supply or power supplies 28 (e.g., battery), to supply electric power to various components. Optionally, the power supply 28 can be connected to logic of the processor 27 via a power management system, and thus achieve functions including, e.g., charge/discharge management, power consumption management, etc. The power supply 28 may further include any other suitable components, e.g., one or more DC or AC power supplies, re-charging system, power failure detection circuit, power converter or inverter, power status indicator, and/or any other suitable components.

Although not shown in FIG. 9, the terminal can further include at least one camera, Bluetooth module, etc. In various embodiments, the processor 27 in the terminal can execute one or more application programs stored in the memory 21 according to the following instructions, in order to achieve various functions.

After a communication interface is started, the processor 27 can control the RF circuit 20 to obtain user IDs of second users from a communication backend server to be displayed by the display unit 23. The second users can be associated with a first user, and a first user-interactive client can belong to the first user. The user IDs of the second users associated with the first user can include second user IDs of second users associated with the first user in one or more communication tools, and/or second user IDs of second users associated with the first user in the user-interactive system.

For example, after the processor 27 starts the communication interface, types of the user IDs of the second users associated with the first user, provided by the communication backend server, can be displayed by the display unit 23, for the user (i.e., the first user) to select. When the processor 27 receives the types selected by the first user from the types of the user IDs, the processor 27 can control the RF circuit 20 to obtain, from the communication backend server, the user IDs (of the other users associated with the first user) that belong to the selected type, for the display unit 23 to display.

The RF circuit 20 can receive user IDs selected by the first user from the user IDs of the second users associated with the first user, for adding to a communication group. The RF circuit 20 can then send, to the communication backend server via the communication interface, a message for joining the communication group. The message for joining the communication group can contain information including, e.g., the selected user IDs.

When the RF circuit 20 receives an accepting message returned by the communication backend server according to the message for joining the communication group, the processor 27 can control the RF circuit 20 to communicate with second clients corresponding the selected user IDs during the user-interactive operation.

Further, the RF circuit 20 can receive a message containing a user ID of the first user. The user ID of the first user is correlated with the first user, and can be of any type. The processor 27 can provide a user input interface. When the processor 27 receives a first communication-tool ID of the first user of any type from the user input interface, the processor 27 can send the first communication-tool ID to the communication backend server, such that the communication backend server can correlate the first communication-tool ID with a first interactive-system ID of the first user in the user-interactive operation. Thus, the user IDs of the second users displayed by the display unit 23 can include the user IDs of the other users associated with the first communication-tool ID of the first user.

Figure 10:
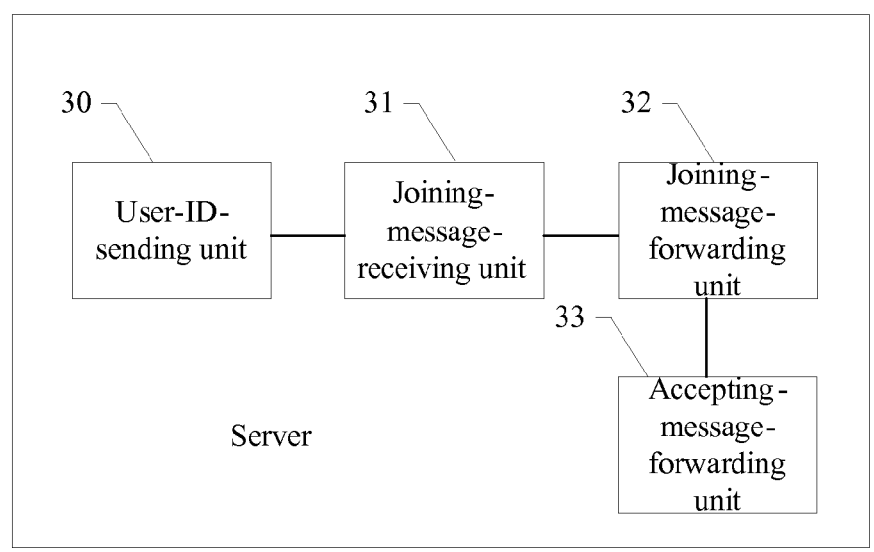
FIG. 10 depicts a structure diagram of an exemplary server in accordance with various disclosed embodiments.

Various embodiments also provide a server. The server can include a communication backend server in accordance with various embodiments disclosed above. Various units of the server can communicate with each other according to various embodiments (e.g., as shown in FIG. 4). FIG. 10 depicts a structure diagram of an exemplary server in accordance with various disclosed embodiments. The exemplary server can include a user-ID-sending unit 30, a joining-message-receiving unit 31, a joining-message-forwarding unit 32, and/or an accepting-message-forwarding unit 33. Certain units may be omitted and other units may be included.

The user-ID-sending unit 30 is configured to send user IDs of second users to a first user-interactive client for displaying. The first user-interactive client can belong to a first user, and the second users can be associated with the first user. The user IDs of the second users associated with the first user can include, e.g., second user IDs of second users associated with the first user in one or more communication tools (i.e., from the second group of the second users), and/or second user IDs of second users associated with the first user in the user-interactive system (i.e., from the first group of the second users). The user IDs sent by the user-ID-sending unit 30 can include user IDs that are online.

The user-ID-sending unit 30 can receive a message of the first user-interactive client logging in using a first interactive-system ID of the first user in user-interactive operation. The user-ID-sending unit 30 can then obtain, from various communication-tool servers, online status of the second user IDs of the second users (from the second group of the second users) associated with the first interactive-system ID. In addition, the user-ID-sending unit 30 can obtain, from the user-interactive-operation-information server, online status of the second user IDs of the second users (from the first group of the second users) associated with the first interactive-system ID. The user-ID-sending unit 30 can then return online user IDs to the first user-interactive client for displaying.

The joining-message-receiving unit 31 is configured to receive a message for joining a communication group sent from the first user-interactive client. The message for joining the communication group can contain information including, e.g., user IDs selected by the first user from the user IDs of the second users sent by the user-ID-sending unit 30.

The joining-message-forwarding unit 32 is configured to forward the message for joining the communication group received by the joining-message-receiving unit 31, to second clients corresponding to the selected second user IDs.

For example, the second client can include second user-interactive clients, the joining-message-forwarding unit 32 can directly forward, to the second user-interactive clients, the message for joining the communication group.

In another example, the second client can include clients for any communication tools associated with the first user. In this case, the joining-message-forwarding unit 32 can send to the second clients, via the any suitable (e.g., corresponding) communication tool, the message for joining the communication group. Thus, under (i.e., via) a server of the communication tool, the second clients can provide the users (i.e., the users of the second clients) with a user interface for prompting whether to accept an invitation to join the user-interactive operation and to communicate with the first user-interactive client. When the users (i.e., the users of the second clients) choose to accept the invitation, the second clients can respectively send accepting messages to the accepting-message-forwarding unit 33 via the servers of the communication tools. Next, the accepting message can be sent to the first user-interactive client. Meanwhile, the second clients can log in the user-interactive-operation-information server, and wait to communicate with the client corresponding to the user ID in the communication group.

The accepting-message-forwarding unit 33 is configured to, when receiving the accepting messages that are returned by the second clients based on the message for joining the communication group forwarded by the joining-message-forwarding unit 32, forward the accepting messages to the first user-interactive client, such that the first user-interactive client can communicate with the second clients.

Using the server according to various embodiments, the user-ID-sending unit 30 can send second user IDs of second users to a first user-interactive client for displaying. The first user-interactive client can belong to a first user, and the second users can be associated with the first user. The second user IDs of the second users associated with the first user can include, e.g., second user IDs of second users associated with the first user in one or more communication tools (i.e., from the second group of the second users), and/or second user IDs of second users associated with the first user in the user-interactive system (i.e., from the first group of the second users). Thus, the first user-interactive client can add, to the communication group, second user IDs selected by the first user from the second user IDs of the second users associated with the first user. During the user-interactive operation, the first user-interactive client can thus communicate with second clients corresponding to the second user IDs in the communication group.

Therefore, a user can communicate with other users via a communication interface provided on a user-interactive client, and does not need to communicate with other users via a third-party communication tool. Communication between users can thus become simpler. In addition, the server disclosed herein can integrate user IDs of other users of various types associated with the first user, and can send the user IDs to the user-interactive client for displaying. Thus, the process of communicating with other users via a third-party communication tool can further be saved.

Figure 11:
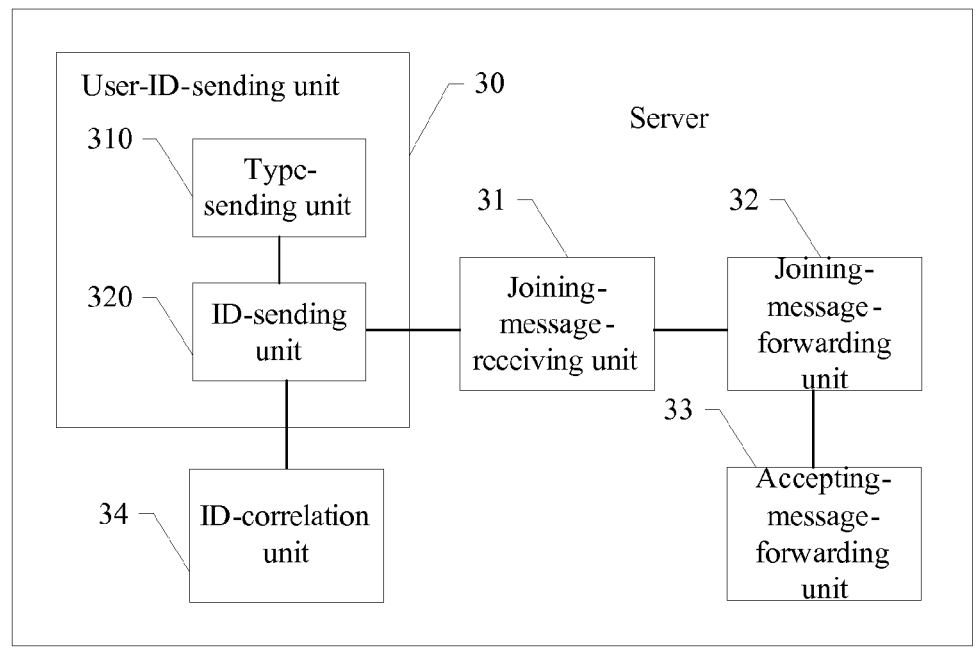
FIG. 11 depicts a structure diagram of another exemplary server in accordance with various disclosed embodiments.

FIG. 11 depicts a structure diagram of another exemplary server in accordance with various disclosed embodiments. In addition to the structure depicted in various embodiments (e.g., as shown in FIG. 10), the server can further include an ID-correlation unit 34. The user-ID-sending unit 30 can include (i.e., be implemented by) a type-sending unit 310 and/or an identification-sending unit 320 (or ID-sending unit 320).

The type-sending unit 310 is configured to provide the first user-interactive client with types of the second user IDs of the second users associated with the first user (i.e., associated with the first interactive-system ID) in order for the first user to select, after receiving a message of the first user-interactive client logging in using a first interactive-system ID of the first user in user-interactive operation.

The ID-sending unit 320 is configured to, after receiving from the first user-interactive client the types selected by the first user from the types of the user IDs sent by the type-sending unit 310, send the user IDs (of the other users associated with the first user) that belong to the selected types to the first user-interactive client for displaying. For example, the ID-sending unit 320 can obtain the online status of the user IDs (of the other users associated with the first user) that belong to the selected types, from a corresponding server, and can return the online user IDs to the first user-interactive client for displaying.

The ID-correlation unit 34 is configured to receive a first communication-tool ID of the first user of any type sent by the first user-interactive client, and to correlate the first communication-tool ID with the first interactive-system ID of the first user in the user-interactive operation. Thus, the user IDs of the second users sent by the ID-sending unit 320 of the user-ID-sending unit 30 can include the user IDs of the other users associated with the first communication-tool ID of the first user.

Figure 12:
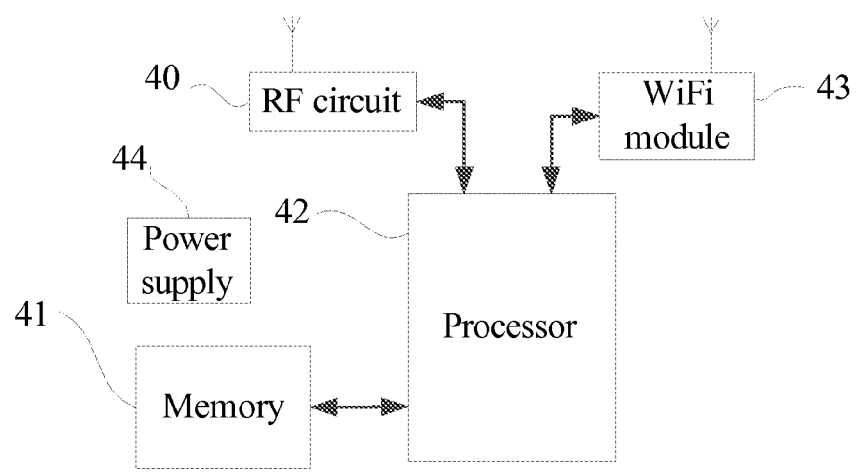
FIG. 12 depicts a structure diagram of an exemplary sever incorporating certain communication methods in a user-interactive system in accordance with various disclosed embodiments.

For illustrative purposes, in the following example, a communication method in a user-interactive system as disclosed herein can be implemented by a server. FIG. 12 depicts a structure diagram of an exemplary sever incorporating certain communication methods in user-interactive system in accordance with various disclosed embodiments.

For example, the server may include a radio frequency (RF) circuit 40, a memory 41 including one or more computer-readable storage media, a wireless fidelity (WiFi) module 43, a processor 42 including one or more processing cores, a power supply 44, and/or other components. The structure of the terminal depicted in FIG. 12 is for illustrative purposes only and does not limit the terminal. More or less than the components illustrated in FIG. 12 can be included, certain components can be combined, and arrangement of the components can be different.

The RF circuit 40 can be used to receive and transmit signals during receiving and transmission of information. For example, the RF circuit 40 can be configured to send received information to the one or more processors 42 for processing. Generally, the RF circuit 40 can include, but not limited to, antenna, at least one amplifier, a tuner, one or more oscillators, transceiver, coupler, low noise amplifier (LNA), duplexer, etc. In addition, the RF circuit 40 can communicate with network and other devices via wireless communication. The wireless communication can use any communication standard or protocol including, but not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), etc.

The memory 41 is configured to store software programs and/or modules. By running or executing the software programs and/or modules stored in the memory 41, and by retrieving data stored in the memory 41, the processor 42 can perform various functions of the server and process data. The memory 41 may include a storage program area and a storage data area. The storage program area is configured to store operating systems and application programs required by one or more functions (e.g., sound playback, image playback, etc.) or any other suitable programs for storing. The storage data area is configured to store data created based on usage of the server (e.g., audio data, phone book, etc.). Further, the memory 41 can include high-speed random access memory (RAM) and/or non-volatile memory, e.g., one or more disk storage devices, flash memory devices, and/or other volatile solid-state memory devices. Accordingly, the memory 41 may also include a memory controller to provide the processor 42 with access to the memory 41.

WiFi is a short-range wireless transmission technology. The server can provide users with wireless broadband Internet access via the WiFi module 43. Although the WiFi module 43 is depicted in FIG. 12, it is not essential to the terminal, and can be omitted according to practical applications, without limitation.

The processor 42 can be a control center of the server, and can be configured to connect various components of the server using various interfaces and circuits. By running or executing software programs and/or modules stored in the memory 41, and by retrieving data stored in the memory 41, the processor 42 can be configured to perform various functions of the server and process data in order for an overall control of the server. Optionally, the processor 42 may contain one or more processing cores. Optionally, the processor 42 may integrate an application processor and a modem processor. The application processor can be configured to mainly process operating systems, user interfaces and application programs, etc. The modem processor can be configured to mainly process wireless communications. Optionally, the modem processor is not integrated into the processor 42.

The server can further include a power supply or power supplies 44 (e.g., battery), to supply electric power to various components. Optionally, the power supply 44 can be connected to logic of the processor 42 via a power management system, and thus achieve functions including, e.g., charge/discharge management, power consumption management, etc. The power supply 44 may further include any other suitable components, e.g., one or more DC or AC power supplies, re-charging system, power failure detection circuit, power converter or inverter, power status indicator, and/or any other suitable components.

Although not shown in FIG. 12, the server can further include other components. In various embodiments, the processor 42 in the terminal can execute one or more application programs stored in the memory 41 according to the following instructions, in order to achieve various functions.

The processor 42 can control the RF circuit 40 to send user IDs of second users to a first user-interactive client for displaying. The first user-interactive client can belong to a first user, and the second users can be associated with the first user. The user IDs of the second users associated with the first user can include, e.g., second user IDs of second users associated with the first user in one or more communication tools, and/or second user IDs of second users associated with the first user in the user-interactive system. For example, the processor 42 may control the RF circuit 40 to provide the first user-interactive client with types of the user IDs of the second users associated with the first user, in order for the user (e.g., the first user) to select. When the RF circuit 40 receives types that are selected by the first user from the types of the user IDs and sent by the first user-interactive client, the processor 42 can control the RF circuit 40 to send the user IDs (of the other users associated with the first user) that belong to the selected types to the first user-interactive client for displaying.

The RF circuit 40 can receive a message for joining a communication group sent from the first user-interactive client. The message for joining the communication group can contain information including, e.g., user IDs selected by the first user from the user IDs of the second users. The processor 42 can control the RF circuit 40 to forward the message for joining the communication group to one or more second clients corresponding to the selected second user IDs.

When the RF circuit 40 receives accepting messages returned by the second clients based on the message for joining the communication group, the processor 42 can control the RF circuit 40 to forward the accepting messages to the first user-interactive client, such that the first user-interactive client can communicate with the second clients.

Further, when the RF circuit 40 receives a first communication-tool ID of the first user of any type sent by the first user-interactive client, the processor 42 can correlate the first communication-tool ID with the first interactive-system ID of the first user in the user-interactive operation. Thus, the user IDs of the second users sent by the RF circuit 40 can include the user IDs of the other users associated with the first communication-tool ID of the first user.

Various embodiments also provide a communication system in a user-interactive system. The communication system can include multiple user-interactive clients and/or a communication backend server.

The multiple user-interactive clients can include the first user-interactive client as described in various embodiments, e.g., as shown in FIGS. 7-8. The communication backend server can include the server as described in various embodiments, e.g., as shown in FIGS. 10-11.

Various embodiments also provide a communication system in a user-interactive system. The communication system can include multiple user-interactive clients and/or a communication backend server.

The multiple user-interactive clients can include the first user-interactive client as described in various embodiments, e.g., the terminal as shown in FIG. 9. The communication backend server can include the server as described in various embodiments, e.g., as shown in FIG. 12.

Part or all of the steps in the methods in accordance with various embodiments can be accomplished using a program/software to instruct related hardware. The program/software can be stored in a computer-readable storage medium including, e.g., ROM/RAM, magnetic disk, optical disk, etc. The computer-readable storage medium is non-transitory.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and apparatus can be used in a variety of Internet applications. By using the disclosed methods, client devices, servers and systems, a communication interface can be started via a first user-interactive client by a first user in a user-interactive system, to communicate with one or more communication tools via a communication backend server. The first user can be associated with a first group of second users in the user-interactive system and the first user can have a first inter-active-system ID. The first user can also be associated with a second group of second users from the one or more communication tools and the first user can have a first communication-tool ID in a corresponding communication tool.

The first user-interactive client can obtain and display, from the communication backend server, a plurality of second user IDs of second users. The second users can include the first group of second users in the user-interactive system, the second group of second users in the one or more communication tools, or a combination thereof. The first user-interactive client can receive one or more second user IDs selected from the plurality of second user IDs by the first user to add to a communication group.

The first user-interactive client can further send, via the communication interface to the communication backend server, a message for joining the communication group containing the one or more second user IDs selected by the first user. An accepting message returned from the communication backend server according to the message for joining the communication group can be received. During a user-interactive operation, the first user-interactive client can communicate with a second client corresponding to a user ID contained in the accepting message.

Therefore, a user can communicate with other users via a communication interface provided on a user-interactive client, and does not need to communicate with other users via a third-party communication tool. Communication between users can thus become simpler. In addition, the communication backend server can integrate user IDs of other users of various types associated with the first user, and can send the user IDs to the user-interactive client for displaying. Thus, the process of communicating with other users via a third-party communication tool can further be saved.

What is claimed is:

1. A communication method in a user-interactive system, implemented by a first user-interactive client, comprising:
   starting a communication interface via the first user-interactive client by a first user in the user-interactive system, to communicate with one or more communication tools via a communication backend server,
   wherein the first user is associated with a first group of second users in the user-interactive system and the first user has a first interactive-system ID, and
   wherein the first user is associated with a second group of second users from the one or more communication tools and the first user has a first communication-tool ID in a corresponding communication tool;
   obtaining and displaying, by the first user-interactive client from the communication backend server, a plurality of second user IDs of second users, wherein the second users include the first group of second users in the user-interactive system, the second group of second users in the one or more communication tools, or a combination thereof;
   receiving, by the first user-interactive client, one or more second user IDs selected from the plurality of second user IDs by the first user to add to a communication group;
   sending, by the first user-interactive client via the communication interface to the communication backend server, a message for joining the communication group containing the one or more second user IDs selected by the first user; and
   receiving an accepting message returned from the communication backend server according to the message for joining the communication group; and during a user-interactive operation performed on the first user-interactive client, communicating with a second client corresponding to a user ID contained in the accepting message via a user-interactive-operation-information server;

wherein after sending the message for joining the communication group and before receiving the accepting message returned from the communication backend server, the method further comprises:

when the second client corresponds to a user from the second group of second users and includes a communication client for the one or more communication tools, sending, by the communication backend server, the message for joining the communication group to the communication client, wherein the second client sends the accepting message to the communication backend server, logs in the user-interactive-operation-information server, and waits to communicate with clients corresponding to the user IDs in the communication group.

2. The method according to claim 1, wherein the one or more communication tools include a voice communication tool, an instant-communication tool, a social space, or a combination thereof.

3. The method according to claim 2, wherein the obtaining and displaying of the plurality of second user IDs from the communication backend server includes:

after starting the communication interface, obtaining and displaying types of the plurality of second user IDs from the communication backend server, in order for the first user to select;

receiving types selected by the first user from the types of the plurality of second user IDs; and obtaining and displaying, from the communication backend server, the plurality of second user IDs of the selected types.

4. The method according to claim 2, wherein before the obtaining and displaying of the plurality of second user IDs from the communication backend server, the method further includes:

receiving, from the first user, a message containing the first communication-tool ID of the first user in the corresponding communication tool;

providing a user input interface;

receiving the first communication-tool ID from the user input interface; and sending the first communication-tool ID to the communication backend server, such that the communication backend server correlates the first communication-tool ID with the first interactive-system ID of the first user in the user-interactive system, wherein the plurality of second user IDs of the second users from the second group of second users in the corresponding communication tool are associated with the first communication-tool ID of the first user in the corresponding communication tool.

5. The method according to claim 1, wherein:

when the second client corresponds to a user from the first group of second users and includes a second user-interactive client performing the same user-interactive operation as the first user-interactive client, directly sending, by the communication backend server, the message for joining the communication group to the second user-interactive client.

6. The method according to claim 1, wherein:

before the second client sends the accepting message to the communication backend server, the second client provides the user with a user interface for prompting whether to accept an invitation to join the user-interactive operation and to communicate with the first user-interactive client.

7. The method according to claim 1, wherein:

the second user IDs of the first group of second users in the user-interactive system are stored in the user-interactive-operation-information server.

8. The method according to claim 1, wherein the user-interactive-operation-information server is configured to:

store data related to the user-interactive operation; and function as a server for the clients in the communication group to communicate with each other during the user-interactive operation.

9. The method according to claim 1, wherein:

the user-interactive operation performed on the first user-interactive client is an online game operation.

10. A communication method in a user-interactive system, implemented by a computer system including a communication backend server, comprising:

sending a plurality of second user IDs of second users to a first user-interactive client of a first user for displaying, wherein the second users include a first group of second users in the user-interactive system, a second group of second users from one or more communication tools, or a combination thereof, wherein the first user is associated with the first group of second users in the user-interactive system and the first user has a first interactive-system ID, and wherein the first user is associated with the second group of second users from the one or more communication tools and the first user has a first communication-tool ID in a corresponding communication tool;

receiving a message for joining a communication group sent from the first user-interactive client, wherein the message for joining the communication group contains one or more second user IDs selected by the first user from the plurality of second user IDs of the second users;

forwarding the message for joining the communication group to a second client corresponding to one of the one or more second user IDs selected by the first user;

receiving an accepting message returned by the second client based on the message for joining the communication group; and forwarding the accepting message to the first user-interactive client, such that the first user-interactive client communicates with the second client via a user-interactive-operation-information server;

wherein forwarding the message for joining the communication group to the second client further comprises:

when the second client corresponds to a user from the second group of second users and includes a communication client for the one or more communication tools, sending the message for joining the communication group to the communication client, wherein the second client sends the accepting message to the communication backend server, logs in the user-interactive-operation-information server, and waits to communicate with clients corresponding to the user IDs in the communication group.

11. The method according to claim 10, wherein the one or more communication tools include a voice communication tool, an instant-communication tool, a social space, or a combination thereof.

12. The method according to claim 11, wherein the sending of the plurality of second user IDs to the first user-interactive client for displaying includes:
- providing the first user-interactive client with types of the plurality of second user IDs, in order for the first user to select;
- receiving, from the first user-interactive client, types selected by the first user from the types of the plurality of second user IDs; and
- sending the plurality of second user IDs of the selected types to the first user-interactive client for displaying.

13. The method according to claim 11, wherein before the sending of the plurality of second user IDs to the first user-interactive client for displaying, the method further includes:
- receiving the first communication-tool ID of the first user in the corresponding communication tool sent by the first user-interactive client, to correlate the first communication-tool ID with the first interactive-system ID of the first user in the user-interactive system,
- wherein the plurality of second user IDs of the second users from the second group of second users in the corresponding communication tool are associated with the first communication-tool ID of the first user in the corresponding communication tool.

14. A client device in a user-interactive system, comprising:
- one or more processors; and
- memory coupled to the one or more processors, the memory having stored thereon software units executed by said one or more processors, the software units comprising:
- a user-ID-display unit configured to:
- start a communication interface by a first user in the user-interactive system, to communicate with one or more communication tools via a communication backend server, wherein the first user is associated with a first group of second users in the user-interactive system and the first user has a first interactive-system ID, and
- wherein the first user is associated with a second group of second users from the one or more communication tools and the first user has a first communication-tool ID in a corresponding communication tool; and
- obtain and display, from the communication backend server, a plurality of second user IDs of second users, wherein the second users include the first group of second users in the user-interactive system, the second group of second users in the one or more communication tools, or a combination thereof;
- a selection-receiving unit configured to receive one or more second user IDs selected from the plurality of second user IDs by the first user to add to a communication group;
- a joining-message-sending unit configured to send, via the communication interface to the communication backend server, a message for joining the communication group containing the one or more second user IDs selected by the first user; and
- a communication unit configured to, when receiving an accepting message returned from the communication backend server according to the message for joining the communication group, communicate with a second client corresponding to a user ID contained in the accepting message via a user-interactive-operation-information server;

wherein after the joining-message-sending unit sends the message for joining the communication group and before the communication units receives the accepting message returned from the communication backend server:
- when the second client corresponds to a user from the second group of second users and includes communication client for the one or more communication tools; the communication backend server sends the message for joining the communication group to the communication client; and
- the second client sends the accepting message to the communication backend server; logs in the user-interactive-operation-information server, and waits to communicate with clients corresponding to the user IDs in the communication group.

15. The client device according to claim 14, wherein the user-ID-display unit includes:
- a type-display unit configured to, after starting the communication interface, obtain and display types of the plurality of second user IDs from the communication backend server, in order for the first user to select; and
- an ID-display unit configured to, after receiving types selected by the first user from the types of the plurality of second user IDs, obtain and display, from the communication backend server, the plurality of second user IDs of the selected types.

16. The client device according to claim 15, wherein the software units further comprise:
- an input-interface-providing unit configured to:
- receive; from the first user, a message containing the first communication-tool ID of the first user in the corresponding communication tool; and provide a user input interface; and
- an ID-sending unit configured to, when receiving the first communication-tool ID from the user input interface, send the first communication-tool ID to the communication backend server, such that the communication backend server correlates the first communication-tool ID with the first interactive-system ID of the first user in the user-interactive system,
- wherein the plurality of second user IDs of the second users from the second group of second users in the corresponding communication tool are associated with the first communication-tool ID of the first user in the corresponding communication tool.

17. A server in a user-interactive system, comprising:
- one or more processors; and
- memory coupled to the one or more processors, the memory having stored thereon software units executed by said one or more processors, the software units comprising:
- a user-ID-sending unit configured to send a plurality of second user IDs of second users to a first user-interactive client of a first user for displaying,
- wherein the second users include a first group of second users in the user-interactive system and a second group of second users from one or more communication tools, or a combination thereof,
- wherein the first user is associated with the first group of second users in the user-interactive system and the first user has a first interactive-system ID, and
- wherein the first user is associated with the second group of second users from the one or more communication tools and the first user has a first communication-tool ID in a corresponding communication tool;

a joining-message-receiving unit configured to receive a message for joining a communication group sent from the first user-interactive client, wherein the message for joining the communication group contains one or more second user IDs selected by the first user from the plurality of second user IDs of the second users;

a joining-message-forwarding unit configured to forward the message for joining the communication group to a second client corresponding to one of the one or more second user IDs selected by the first user; and an accepting-message-forwarding unit configured to, when receiving an accepting message returned by the second client based on the message for joining the communication group, forward the accepting message to the first user-interactive client, such that the first user-interactive client communicates with the second client via a user-interactive-operation-information server;

wherein the joining-message-forwarding unit is further configured to:

when the second client corresponds to a user from the second group of second users and includes a communication client for the one or more communication tools; send the message for joining the communication group to the communication client wherein the second client sends the accepting message to the communication backend server, logs in the user-interactive-operation-information server, and waits to communicate with clients corresponding to the user IDs in the communication group.

18. The server according to claim 17, wherein the user-ID-sending unit includes:

a type-sending unit configured to provide the first user-interactive client with types of the plurality of second user IDs, in order for the first user to select; and an ID-sending unit configured to, after receiving from the first user-interactive client types selected by the first user from the types of the plurality of second user IDs, send the plurality of second user IDs of the selected types to the first user-interactive client for displaying.

19. The server according to claim 18, wherein the software units further comprise:

an ID-correlation unit configured to receive the first communication-tool ID of the first user in the corresponding communication tool sent by the first user-interactive client, to correlate the first communication-tool ID with the first interactive-system ID of the first user in the user-interactive system, wherein the plurality of second user IDs of the second users from the second group of second users in the corresponding communication tool are associated with the first communication-tool ID of the first user in the corresponding communication tool.

20. A communication system in a user-interactive system, comprising multiple computers including:

the server according to claim 17;

the first user-interactive client according to claim 17; and the second client according to claim 17.

* * * * *